(12) United States Patent
Amatucci et al.

(10) Patent No.: US 8,518,604 B2
(45) Date of Patent: Aug. 27, 2013

(54) METAL FLUORIDE AND PHOSPHATE NANOCOMPOSITES AS ELECTRODE MATERIALS

(75) Inventors: Glenn Amatucci, Peapack, NJ (US); Fadwa Badway, Old Bridge, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 926 days.

(21) Appl. No.: 12/025,662

(22) Filed: Feb. 4, 2008

(65) Prior Publication Data

US 2008/0199772 A1    Aug. 21, 2008

Related U.S. Application Data

(60) Provisional application No. 60/899,105, filed on Feb. 2, 2007.

(51) Int. Cl.
| | |
|---|---|
| *H01M 6/02* | (2006.01) |
| *H01M 4/50* | (2010.01) |
| *H01M 4/52* | (2010.01) |
| *H01M 4/56* | (2006.01) |
| *H01M 4/58* | (2010.01) |
| *H01M 4/04* | (2006.01) |

(52) U.S. Cl.
USPC ........... 429/523; 429/220; 429/221; 429/223; 429/224; 429/405; 429/532

(58) Field of Classification Search
USPC ................. 429/523, 532, 220, 221, 223, 224, 429/405; 252/250.3, 521.6, 521.2
See application file for complete search history.

(56) References Cited

U.S. PATENT DOCUMENTS

| | | | |
|---|---|---|---|
| 6,495,481 B1 * | 12/2002 | Margaryan | 501/44 |
| 6,890,686 B1 | 5/2005 | Barker | |
| 2006/0014078 A1 | 1/2006 | Swoyer et al. | |
| 2006/0019163 A1 * | 1/2006 | Amatucci et al. | 429/220 |
| 2006/0199886 A1 | 9/2006 | Ryang | |
| 2007/0009800 A1 | 1/2007 | Barker et al. | |
| 2008/0153002 A1 * | 6/2008 | Nazar et al. | 429/221 |

FOREIGN PATENT DOCUMENTS

| | | |
|---|---|---|
| WO | 02/097907 | 12/2002 |
| WO | 2006/026773 | 3/2006 |

OTHER PUBLICATIONS

Amatucci et al., "Fluoride Based Electrode Materials for Advanced Energy Storage Devices", Journal of Fluorine Chemistry 128 (2007); published online Dec. 13, 2006; pp. 243-262.
Arico, "Nanostructured Materials for Advanced Energy conversion and Storage Devices", Nature Materials 2005, pp. 366-377.
Hong Li et al: "Li-Storage via Heterogeneous Reaction in Selected Binary Metal Fluorides and Oxides", Journal of the Electrochemical Society, vol. 151, No. 11, Jan. 1, 2004, pp. A1878-A1885.
Nel, A. et al., "Toxic Potential of materials at the Nanolevel," Science, 311 (5761): 622-627 (2006).
Poizot, P. et al., "Nano-sized transition-metal oxides as negative-electrode materials for lithium-ion batteries," Nature, Sep. 28, 2000; 407(6803): 496-499.
Pereira, N. et al., "The Electrochemistry of Germanium Nitride with Lithium," J. Electrochem. Soc., 150(8): A1118-A1128 (2003).
Li, H. et al., "Reversible formation and decomposition of LiF clusters using transition metal fluorides as precursors and their application in rechargeable Li batteries," Adv. Mater., 15 (9): 736-739 (2003).
Badway, F. et al., "Carbon-metal fluoride nanocomposites: structure and electrochemistry of FeF3:C," J. Electrochem. Soc., 150(9): A1209-A1218 (2003).
Plitz, I. et al., "Structure and electrochemistry of carbon-metal fluoride nanocomposites fabricated by solid-state redox conversion reaction," J. Electrochem. Soc., 152(2): A307-A315 (2005).
Bervas, M. et al., "Bismuth fluoride nanocomposites as a positive electrode material for rechargeable lithium batteries," Electrochem. Solid-State Lett., 8(4): A179-A183 (2005).
Bervas, M. et al., "Reversible conversion reactions with lithium in bismuth oxyfluoride nanocomposites," J. Electrochem. Soc., 153(1): A159-A170 (2006).
Bervas, M. et al., "Investigation of the lithiation and delithiation conversion mechanisms of bismuth fluoride nanocomposites," J. Electrochem. Soc., 153(4): A799-A808 (2006).
Amatucci et al.: 'Fluoride based electrode materials for advanced energy storage devices' Journal of Fluorine Chemistry vol. 128, pp. 243-262 (2006).
H. F. Bauman, Proceedings of the 18th Annual Power Sources Conference, PSC Publications, May 1964, p. 89.
H. F. Bauman, Proceedings of the 20th Annual Power Sources Conference, PSC Publications, May 1966, pp. 73-76.
Elliot, W. E. et al., "A program to develop a high-energy density primary battery with a minimum of 200 watt hours per pound of total battery weight," Contract Report prepared for National Aeronautics and Space Administration, CR-54873, Dec. 31, 1965.

* cited by examiner

*Primary Examiner* — Patrick Ryan
*Assistant Examiner* — Ladan Mohaddes
(74) *Attorney, Agent, or Firm* — Beverly W. Lubit; Greenberg Traurig, LLP

(57) ABSTRACT

The present invention relates to primary and secondary electrochemical energy storage systems. More particularly, the present invention relates to such systems as battery cells, especially battery cells utilizing metal fluorides with the presence of phosphates or fluorophosphates, which use materials that take up and release ions as a means of storing and supplying electrical energy.

25 Claims, 11 Drawing Sheets

METAL FLUORIDE AND PHOSPHATE NANOCOMPOSITES AS ELECTRODE MATERIALS

CROSS REFERENCE TO RELATED APPLICATION

This application is based upon and claims the benefit of the priority of U.S. Provisional Patent Application No. 60/899,105, filed Feb. 2, 2007. The entire disclosure of U.S. Provisional Patent Application No. 60/899,105 is incorporated herein by reference.

FIELD OF INVENTION

The present invention relates to primary and secondary electrochemical energy storage systems. More particularly, the present invention relates to such systems as battery cells, especially battery cells utilizing metal fluorides with the presence of phosphates or fluorophosphates, which use materials that take up and release ions as a means of storing and supplying electrical energy.

BACKGROUND OF THE INVENTION

The lithium-ion battery cell is the premier high-energy rechargeable energy storage technology of the present day. Unfortunately, its high performance still falls short of energy density goals in applications ranging from telecommunications to biomedical. Although a number of factors within the cell contribute to this performance parameter, the most crucial ones relate to how much energy can be stored in the electrode materials of the cell. Based on electrodes utilizing intercalation processes, the present day state of the art Li-ion battery technology exhibits an energy density in excess of 200 Wh/kg and 420 Wh/l. The energy density of lithium battery technology is far less than half of the theoretical energy densities that could be achieved. The technology is currently limited by the energy density of the positive electrode. This is due to intercalation reactions limiting the amount of $Li^+$ inserted, thereby limiting electron transfer to typically less than $1e^-$ per compound such as $LiMeO_2$, where Me is a transition metal.

During the course of development of rechargeable electrochemical cells, such as lithium (Li) and lithium-ion battery cells and the like, numerous materials capable of reversibly accommodating lithium ions have been investigated. Materials of the present invention include conversion and reverse conversion compounds which allow for multiple electrons to be transferred to the active electrode to reduce fully to the metal state plus lithium salt and then subsequently reoxidize back to the original compounds. Existing state of the art materials include occlusion and intercalation materials, such as carbonaceous compounds, layered transition metal oxide, and three dimensional pathway spinels which have proven to be particularly well-suited to such applications. However, even while performing reasonably well in recycling electrical storage systems of significant capacity, many of these materials exhibit detrimental properties, such as marginal environmental compatibility and safety, which detract from the ultimate acceptability of the rechargeable cells. In addition, some of the more promising materials are available only at costs that limit widespread use. However, of most importance is the fact that the present state of the art materials have the capability to store relatively low capacity of charge per weight of material (specific capacity, mAh/g) or energy per weight (specific energy, Wh/kg).

Materials of choice in the fabrication of rechargeable battery cells, particularly highly desirable and broadly implemented Li-ion cells, have for some considerable time centered upon graphitic negative electrode compositions, which provide respectable capacity levels in the range of 300 mAh/g. Complementary positive electrode materials in present cells use less effective layered intercalation compounds, such as $LiCoO_2$, which generally provides capacities in the range of 150 mAh/g. Alternative intercalation materials, such as $LiNiO_2$, and $LiMn_2O_4$, have more recently gained favor in the industry, since, although exhibiting no appreciable increase in specific capacity, these compounds are available at lower cost and provide a greater margin of environmental acceptability.

Due to increasing demand for ever more compact electrical energy storage and delivery systems for all manner of advancing technologies, the search continues for battery cell materials capable of, on the one hand, providing greater specific capacity over wider ranges of cycling rates, voltages, and operating temperatures, while, on the other hand, presenting fewer environmental hazards and greater availability at lower processing and fabrication costs.

In the search of material systems which can deliver much higher specific capacities and energy, interest has shifted to examination of the more active fluoride compounds. Primary metal fluorides have been known for well over 30 years as attractive electrode materials, however, the higher voltage materials exhibit a high bandgap resulting in insulator properties and very poor electrochemical activity. Recently, reversible conversion reactions in metal fluorides have been shown to occur. Badway et al. (*Journal of The Electrochemical Society*, 150(9) A1209-A1218 (2003)) reported the use of carbon metal fluoride nanocomposites to enable the electrochemical activity of metal fluorides. Their studies have shown that reducing the particle size of high bandgap, insulating metal fluorides to the nanodimensions in combination with highly conductive carbon resulted in the enablement of a new metal fluoride conversion process resulting in a major improvement in specific capacity relative to current state of the art. Badway et al. reported greater than 90% recovery of the $FeF_3$ theoretical capacity (less than 600 mAh/g) in the 4.5-1.5 V region through reversible conversion, which is a fundamentally different energy storage mechanism compared with the present state of the art intercalation.

Until recently, full utilization of certain metal fluorides, such as copper fluoride, has not been realized. Researchers have tried to enable this high energy density compound for more than 30 years with only limited success because of poor utilization of the material. Copper fluoride has a theoretical conversion potential of approximately 3.2 V and a discharge specific capacity of approximately 520 mAh/g. This leads to an exceptionally high energy density in excess of 1500 Wh/kg. Such capacity values are over 300% higher than those attained in present day state-of-the-art rechargeable Li battery cells based on $LiCoO_2$ intercalation compounds. With respect to existing primary cathode compounds, copper fluoride would exceed the widely utilized $MnO_2$ energy density by almost a factor of two and copper fluoride compounds exceed the volumetric energy density of copper monofluoride by 20-30%. U.S. Patent Publication No. 2006/0019163, which is hereby incorporated by reference discusses nanocomposite technology that has enabled greater than 99% of the theoretical specific capacity of copper fluoride.

Despite the promising energy densities extracted for a number of the metal fluoride nanocomposite technologies, challenges still exist. For the reversible conversion metal fluorides, the ability to retain a larger percentage of the capacity during reversible cycling is desired. In copper fluoride nanocomposites, the material has a poor ability to retain charge when stored at elevated temperatures in its partially discharged state. For example, state of the art materials typically lose 100% of their capacity after one week at 40° C. or 60° C. when they are previously partially discharged. These present a great challenge to researchers where no obvious methodology exists to improve such performances.

Hence, there is a need in the art for electrical energy-storage and delivery systems that utilize copper fluoride effectively.

SUMMARY OF THE INVENTION

The present invention relates generally to the formation and utilization of nanostructures of metal fluorides. More preferably, the invention relates to the formation of metal fluoride nanostructures which incorporate novel conducting matrices and are in the presence of phosphates or fluorophosphates. The nanostructures serve as active electrode component materials for use in electrochemical cells, such as lithium battery cells, capable of exhibiting high specific capacity at high recharge and/or discharge rates.

The invention relates, more specifically, to the formation of metal fluoride based nanocomposites with the presence of phosphates or fluorophosphates. An aspect of the invention relates to the improvement of the electrochemical properties of metal fluoride nanocomposites with the addition of phosphate or fluorophosphate species to the composite.

Another embodiment of the present invention provides a composition including a metal fluoride nanocomposite compound with a phosphate or fluorophosphate species as an electrode material for an electrochemical storage unit.

In a further embodiment of the present invention, a method of preparing a metal fluoride nanocomposite compound comprises the steps of combining a metal fluoride and a conductive matrix to form a first product, combining the first product and a phosphate adding group, and fabricating the second product into a nanocomposite. Specifically, the phosphate adding group may be lithium metaphosphates, lithium hydrogen phosphates, methyl phosphates, ammonium phosphates, hydrogen phosphates, or various metal phosphates.

In a further embodiment, the invention is drawn to a composite comprising at least about 50% molar content of a metal fluoride and a phosphate.

In a further embodiment, the composite demonstrates a specific capacity of about 100 mAh/g to about 600 mAh/g at a voltage of about 2 volts to about 4 volts when compared to a $Li/Li^+$ reference potential.

In a further embodiment, the metal of the metal fluoride is selected from the group consisting of Fe, Cr, Nb, Rh, Ag, Au, Se Co, Te, Ni, Mn, Cu, V, Mo, Pb, Sb, Bi, or Si. Preferably, the metal is selected from the group consisting Cu, Bi, or Fe.

In another embodiment, the metal fluoride is $CuF_2$.

In another embodiment, the metal fluoride is $BiF_3$.

In yet another embodiment, the metal fluoride is doped with, that is, injected with or annealed with oxygen by abstracting oxygen from another component in the nanocomposite, up to approximately 10% oxygen.

In another embodiment of the present invention, the phosphate is present in an amount that is less than 50 weight % of the composition.

In still a further embodiment, the phosphate is a distinct subdomain distributed within the composite.

In another embodiment, the phosphate is a metal phosphate, fluorophosphate, metal fluorophosphate. Preferably the phosphate is a copper fluorophosphate.

In an embodiment of the invention, the composite further comprises a conductive matrix selected from the group consisting of $VO_2$, $MoO_2$, $MoO_3$, $MoS_2$, $V_2O_5$, $V_6O_3$, NiO, CuO, carbon fluorides, nitrides, selenide, tellurides, silicates, molybdenum sulfides, molybdenum oxysulfides, titanium sulfide, chromium oxide, manganese oxide ($MnO_2$), and $MoO_xF_z$, wherein x is $0 \leq x \leq 3$ and z is $0 \leq z \leq 5$ combined in such a way that an effective charge on the Mo cation is not more than $6^+$.

In another embodiment, the invention is drawn to a nanocomposite comprising at least approximately 50% molar content of a metal fluoride and a phosphate.

In another embodiment of the invention, the nanocomposite comprises at least one dimension of each of the metal fluoride and the phosphate, wherein each dimension is less than 100 nm.

In another embodiment of the invention, the nanocomposite comprises at least two dimensions of each of the metal fluoride and the phosphate, wherein each dimension is less than 100 nm.

In a further embodiment of the invention, the nanocomposite composition is formed of crystallites of about 1 nm to about 100 nm in diameter.

In an embodiment of the invention, the nanocomposite demonstrates a specific capacity around 100 mAh/g to about 600 mAh/g at a voltage of about 2 volts to about 4 volts when compared to a $Li/Li^+$ reference potential.

In another embodiment of the invention, the phosphate is a distinct nanodomain distributed within the composite.

In an embodiment of the invention, a nanocomposite further comprises a conductive matrix selected from the group consisting of $VO_2$, $MoO_2$, $MoO_3$, $MoS_2$, $V_2O_5$, $V_6O_{13}$, NiO, CuO, carbon fluorides, nitrides, selenides, tellurides, silicates, molybdenum sulfides, molybdenum oxysulfides, titanium sulfide, chromium oxide, manganese oxide ($MnO_2$), and $MoO_xF_z$, wherein x is $0 \leq x \leq 3$ and z is $0 \leq z \leq 5$ combined in such a way that an effective charge on the Mo cation is not more than $6^+$.

In a further embodiment of the invention, the nanocomposite further comprises carbon or oxygen.

In an embodiment of the invention, wherein the specific capacity of the nanocomposite is rechargeable by passing a current through the nanocomposite in a direction opposite a discharge direction.

In yet another embodiment, the invention provides an electrochemical cell comprising a negative electrode, a positive electrode comprising a nanocomposite comprising a metal fluoride and a phosphate, and a separator disposed between the negative and positive electrodes.

In an embodiment, the cell further comprises an electrolyte composition, which includes at least one metallic salt. The at least one metallic salt is selected from the group consisting of a lithium salt, a magnesium salt, a calcium salt, a zinc salt, a manganese salt, and a yttrium salt.

In an embodiment, the cell has a specific capacity, the specific capacity rechargeable by passing a current through the nanocomposite in a direction opposite a discharge direction.

In another embodiment, the nanocomposite is formed of particles that are about 1 nm to about 100 nm in diameter.

In yet another embodiment, the cell utilizes a lithium-based negative electrode.

In another embodiment, the cell further comprising a negative electrode selected from the group consisting of a magnesium-based negative electrode, a calcium-based negative electrode, a zinc-based negative electrode, a manganese-based negative electrode, and a yttrium-based negative electrode.

In an embodiment, the invention provides a method of preparing a nanocomposite comprising a metal fluoride and a phosphate, the method comprising the steps of combining a metal fluoride and a conductive matrix forming a first product, combining said first product with a phosphate-adding group forming a second product, and fabricating the second product into a nanocomposite.

In an embodiment, the method further comprises the step of milling the copper fluoride and conductive matrix by high energy milling.

In another embodiment, the method of the invention further comprises milling the first product and the phosphate adding compound by high energy milling.

In an embodiment of the invention, the conductive matrix is selected from the group consisting of $VO_2$, $MoO_2$, $MoO_3$, $MoS_2$, $V_2O_5$, $V_6O_{13}$, NiO, CuO, $Bi_2Te_3$, carbon fluorides, nitrides, selenides, tellurides, silicates, molybdenum sulfides, molybdenum oxysulfides, titanium sulfide, chromium oxide, manganese oxide ($MnO_2$), and $MoO_xF_z$, wherein x is $0 \leq x \leq 3$ and z is $0 \leq z \leq 5$ combined in such a way that an effective charge on the Mo cation is not more than $6^+$. Preferably, the conductive matrix is $MoO_3$, $MoS_2$, or $Bi_2Te_3$ In an embodiment of the invention. the phosphate adding group is lithium metaphosphate, lithium hydrogen phosphate, hydrogen phosphate, methyl phosphate, ammonium phosphate or ammonium hydrogen phosphate. Preferably, the phosphate adding group is present in an amount that is less than 50 weight % of the composition.

DETAILED DESCRIPTION OF THE INVENTION

Figure 1:
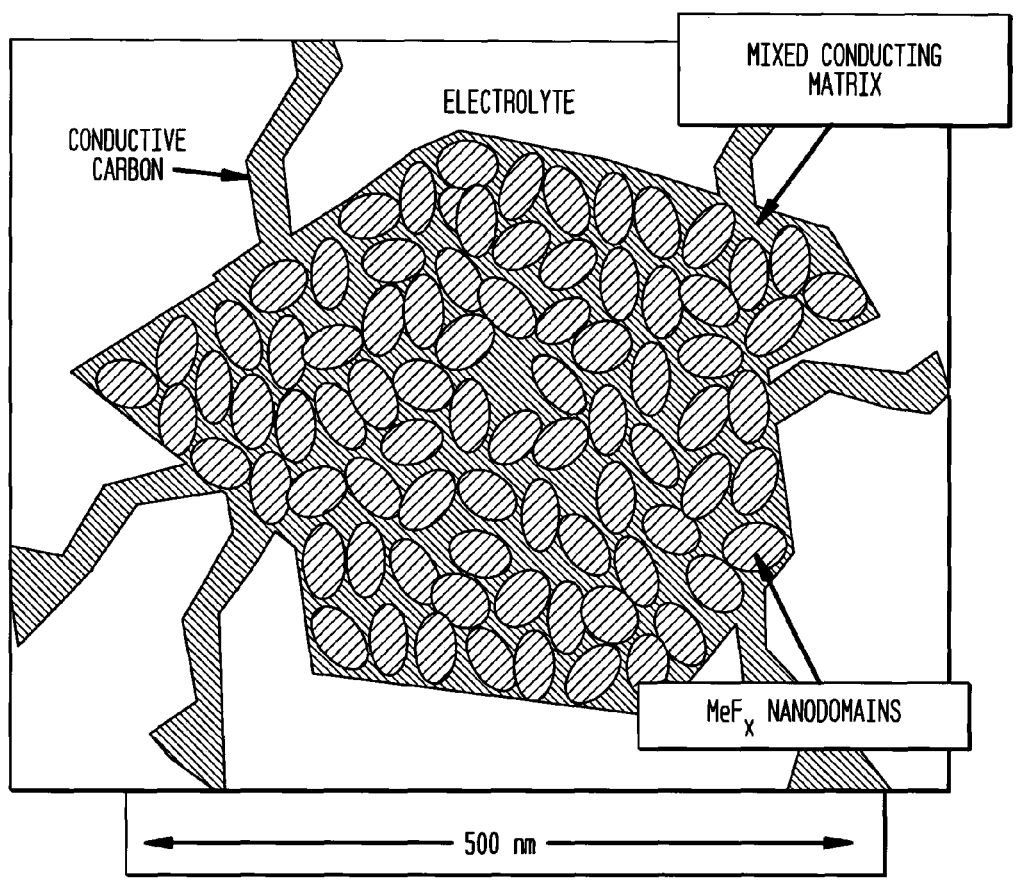
FIG. 1 is a schematic depicting charge transport issues relative to a metal fluoride nanocomposite containing a mixed conducting matrix.

The present invention provides improved materials for battery components, specifically for positive electrodes in primary and rechargeable cells. More particularly, the invention relates to the improvement of the electrochemical properties of metal fluoride nanocomposites with the addition of phosphate or fluorophosphate species to the composite.

In one embodiment, the present invention provides a composite comprising a metal fluoride and a phosphate, wherein the phosphate may be a distinct subdomain of the composite or alternatively, is part of the metal fluoride. The composite demonstrates a specific capacity of from about 100 mAh/g to from about 600 mAh/g at a voltage of about 2 V to about 4 V when compared to a $Li/Li^+$ reference potential. In a preferred embodiment, the demonstrated specific capacity is from about 300 mAh/g to about 500 mAh/g. As used herein, "specific capacity" refers to the amount of energy the nanocomposite contains in milliamp hours (mAh) per unit weight. In an embodiment, the metal fluoride comprises at least 50% molar content of the composite.

In another embodiment, the present invention provides a nanocomposite comprising a metal fluoride and a phosphate, wherein the phosphate may be a distinct subdomain of the composite or alternatively, is part of the metal fluoride. The nanocomposite demonstrates specific capacity of from about 100 mAh/g to from about 600 mAh/g at a voltage of about 2 V to about 4 V when compared to a Li/Li+ reference potential. In a preferred embodiment, the demonstrated specific capacity is from about 300 mAh/g to about 500 mAh/g.

The nanocomposite may be composed of a multitude of phases, each with a distinct function. For example, exceptional performance of metal fluoride compositions are enabled when the metal fluorides are formed into nanocomposites with transport assisting materials. The latter materials consist of carbons, metal oxides, metal sulfides, metal nitrides, and combinations of these.

The metal fluoride of the composition includes a metal. One of skill in the art can readily identify metals for use for use in metal fluoride compound composites of the present invention. Such metals include, but are not limited to, non-transition metals and transition metals, preferably transition metals, and more preferably first row transition metals. Specific examples of metals for use in nanocomposites of the present invention include, but are not limited to: V, Cr, Mn, Fe, Co, Ni Cu, Nb, Mo, Se, Rh, Te, Ag, Au, Pb, Sb, and Bi.

In a preferred embodiment, the metal is Bi, Cu, or Fe. Preferably, the metal fluoride of the invention is $CuF_2$ or $BiF_3$. The metal fluoride of the present invention may be further doped up with 10% oxygen.

The phrase, "nanocomposite" can be defined as a composite of materials whose primary molar constituency is a metal fluoride where all the components have at least one dimension, which is less than 100 nm. Although the distribution of such nanocomposite is not limited by definition, all components must be contained within an area that is less than 1000 nm, preferably 200-800 nm.

In one embodiment, the specific capacity of the nanocomposite is reversible. "Reversible specific capacity" means that the nanocomposite of the present invention may be recharged by passing a current through it in a direction opposite to that of discharge.

The nanocomposite may be a "metal fluoride compound nanocomposites," which, as used herein, means nanocrystallites comprising at least a "metal fluoride compound" incorporated within a nanocomposite, which may or may not be of nanoparticle size. As used herein, the phrase, "metal fluoride compound" includes any compound that comprises the elements of fluorine (F) a metal for use in lithium fluoride compounds including, but not limited to, Fe, Cr, Nb, Rh, Ag, Au, Co, Ni, Mn, Cu, V, Mo, Pb, Se, Sb, Te, Bi, or Si. Examples of metal fluoride compounds include, but are not limited to, $CuF_2$ and $BiF_3$.

The performance of the nanocomposites is greatly improved with the addition of phosphate or fluorophosphate to the nanocomposite structure. The phosphate species have been found to improve the performance of the metal fluoride nano-composites either through becoming a distributed nanodomain within the composite or inducing the formation of a metal phosphate or fluorophosphate with the host metal of the metal fluoride. Such phosphates can be added as, for example, lithium metaphosphates, lithium hydrogen phosphates, methyl phosphates, ammonium phosphates, hydrogen phosphates, or as various metal phosphates. Due to the extreme reactivity at the nano dimensions, such phosphates may lose their individual character and combine partially with the components of the existing matrix to form mixed metal phosphate or metal fluorophosphate. Such examples of the latter reaction are clearly defined in the examples below in the case of copper fluoride/molybdenum oxide nanocomposites, where the addition of various phosphates induces the formation of a copper fluorophosphate. In many cases, the identification of such phases are extremely difficult through traditional techniques such as x-ray diffraction, electron diffraction and vibrational analysis. Such phases can then be considered to be x-ray amorphous. The performance improvements derived from this invention range from improved storage at elevated temperatures to retention of capacity with cycling.

The phosphate may be a fluorophosphate, a metal phosphate, or a metal fluorophosphate, wherein the metal is the same metal as in the metal fluoride. In one embodiment, the phosphate is copper phosphate. The nanocomposite of the present invention includes, preferably, from about 2 to about 50 weight % of phosphates. In another, preferred, embodiment, the nanocomposite of the present invention includes from about 2 to about 25 weight % of phosphates. The nanocomposites of the present invention may further include a conductive matrix. As used herein, a "conductive matrix" refers to a matrix that includes conductive materials, some of which may be ionic and/or electronic conductors. Preferably the matrix will retain both ionic and electronic conductivity; such materials are commonly referred to as "mixed conductors".

The enablement of reversible conversion metal fluorides relies on effective transport of both ions and electrons to the metal fluoride nanodomain, as shown in FIG. 1. The electronic charge is brought to the nanocomposite via the electronically conductive carbon black typically utilized in the porous positive electrode along with lithium ions through the ionically conductive electrolyte. In order for a nanocomposite concept to be utilized effectively, the electronic and ionic charge must be transported from the carbon and electrolyte conductors through a highly conducting matrix, which links all the metal fluoride nanodomains within the nanocomposite. Initial matrices consisted of carbon but recently mixed conducting matrices combine the ionic and electronic transport duties to one material, the mixed conductor. Mixed conductors utilized as the matrix can be easily represented by intercalation compounds, which maintain excellent electronic and ionic conduction. In order to exhibit the latter, the material should intercalate and reduce at a voltage above or similar to the conversion reaction of the metal fluoride. Attractive materials such as $V_2O_5$, $MoS_2$, and $MoO_{3-\delta}$ can be utilized. Examples of metal fluorides enabled by these MCM matrices are nanocomposites of $FeF_3$ ($V_2O_5$), $BiF_3$ ($MoS_2$), and $CuF_2$ ($MoO_3$), respectively. In all cases the nanocomposites exhibit relative low surface areas as the electronic and ionic charge are carried by the matrix to the nanodomains.

Suitable conductive matrices include, but are not limited to, sulfides, fluorides, silicates, selenides, tellurides, nitrides, $VO_2$, $MoO_2$, $MOS_2$, NiO, $MoO_3$, molybdenum sulfides, molybdenum oxysulfides, titanium sulfide, $MoO_xF_z$, wherein x is $0 \leq x \leq 3$ and z is $0 \leq z \leq 5$ combined in such a way that the effective charge on the Mo cation is not more than 6+, $V_2O_5$, $V_6O_{13}$, CuO, $MnO_2$, chromium oxides, and carbon fluorides, for example, $CF_{0.8}$.

The nanocomposite of the present invention includes, preferably, from about 5 to about 50 weight % of a conductive matrix. In another, preferred, embodiment, the metal fluoride of the present invention includes from about 1 to about 25 weight % of a conductive matrix. Even more preferably, the composite of the present invention includes from about 2 to about 15 weight % of a conductive matrix.

In another embodiment, the nanocomposite may further include oxygen. One of skill in the art will recognize that oxygen can substitute for fluorine in metal fluorides. Oxygen may act to significantly improve the electrical conductivity of the nanocomposite of the invention.

In another embodiment, the nanocomposite may include a second metal.

In yet another embodiment, both oxygen and a second metal are included in the nanocomposite of the present invention.

Carbon may, optionally, be included in the nanocomposite of the present invention. Preferably, less than 50 weight % of carbon is used. More preferably, less than 25 weight % carbon is used. Even more preferably less than 5 weight % carbon is used. Yet, still more preferably, the nanocomposite is of the formula $Cu_xMe_yF_zO_wC$, wherein x+z>y+w and w>0, for example, when copper is utilized.

The nanocomposites of the present invention may be prepared by extreme, high impact-energy milling of a mixture that includes a metal fluoride compound and 5 to 50 weight % of a conductive matrix to form a first product. The first product containing a metal fluoride and conductive matrix is then milled with 2-50 weight % of one of lithium metaphosphate, lithium hydrogen phosphate, hydrogen phosphate, methyl phosphate, ammonium phosphate, or ammonium hydrogen phosphate to add a phosphate species to the nanocomposite. Thus, the nanocomposite of the present invention can be prepared by using an impact mixer/mill such as the commercially available SPEX 8000 device (SPEX Industries, Edison N.J., USA). Unlike the shearing action of conventional planetary, roller, or ball mills, which at best may allow for size reduction of crystallite particles to the micrometer range, the extremely high-energy impact action impressed upon the component mixture by the impact mill provides, within milling periods as short as about 10 minutes, a particle size reduction of the processed material to the nanostructure range of less than about 100 nm. Further milling for as little as 30 minutes up to about 4 hours brings about crystallite-particle size reduction to less than about 40 nm.

Alternatively a planetary milling apparatus (Retsch) may be utilized to perform similar operations in $ZrO_2$ lined cells. For milling of phosphates, 2-50 weight % of phosphates are premixed with the reagents before milling in a similar way to form the desired nanocomposite. The cell was sealed before milling and opened and the contents were removed after milling in the helium atmosphere of the glovebox.

Other methods may be used to form the nanocomposites of the present invention. As will be evident to a skilled artisan, solution or gel techniques may be used to fabricate the nanocomposites. Generally, as used herein, solution, gel, or high-energy impact milling techniques are referred to as "nanocomposite fabrication methods."

When a metal fluoride is milled with another component, the metal fluoride undergoes chemical changes such that its X ray diffraction characteristics takes on the character of a new, highly electrochemically active material, although retaining major aspects of the metal fluoride. In addition, the nanocrystallite formation can be characterized easily by well known methods such as Bragg peak broadening in x-ray diffraction and microscopy by methods such as transmission electron microscopy.

In another aspect of the present invention, an electrochemical cell, preferably a primary or rechargeable battery cell, is provided which employs the inventive nanocomposites as the cathode material. The cell may be prepared by any known method. The inventive nanocomposite electrode (cathode) materials function well with most other known primary or secondary cell composition components, including polymeric matrices and adjunct compounds, as well as with commonly used separator and electrolyte solvents and solutes.

The nanocomposite may be composed of a multitude of phases, each with a distinct function. For example, exceptional performance of metal fluoride compositions are enabled when the metal fluorides are formed into nanocomposites with transport assisting materials. The latter materials consist of carbons, metal oxides, metal tellurides, metal sulfides, metal selenides, metal nitrides, and combinations of these.

Electrolyte compositions commonly used in known rechargeable electrochemical-cell fabrication serve well in the cells of the present invention. These electrolyte compositions may include one or more metallic salts, such as, but not limited to, lithium, magnesium, calcium, zinc, manganese, and yttrium. Lithium salts, such as $LiPF_6$, $LiBF_4$, $LiClO_4$, and the like, dissolved in common cyclic and acyclic organic solvents, such as ethylene carbonate, dimethyl carbonate, propylene carbonate, ethyl methyl carbonate, and mixtures thereof, may be used. Another electrolyte which may be used consists of lithium bis(trifluoromethane sulfone imide (LiN $(SO_2CF_3)_2$ LiTFSI) salt dissolved in a blend of carbonate solvents. As with optimization of the nanocomposites of the present invention, specific combinations of electrolyte components will be a matter of preference of the cell fabricator and may depend on an intended use of the cell, although consideration may be given to the use of solutes such as $LiBF_4$, which appear less susceptible during cell cycling to hydrolytically forming HF, which could affect the optimum performance of some metal fluorides. For such reason, for instance, a $LiBF_4$:propylene carbonate electrolyte may be preferred over one comprising a long-utilized standard solution of $LiPF_6$ in a mixture of ethylene carbonate:dimethyl carbonate. In addition, such nanocomposites may be incorporated into solid state polymer cells utilizing solid state ionically conducting matrices derived from compounds such as polyethylene oxide (PEO). Nanocomposites also may be fabricated by thin film deposition techniques and be incorporated into solid state thin film lithium batteries utilizing a glassy electrolyte. Finally, such electrode materials may be incorporated into cells utilizing ionic liquid solvents as the electrolytes.

Likewise, the negative electrode members of electrochemical cells may advantageously include any of the widely used known ion sources such as lithium metal and lithium alloys, such as those comprised of lithium tin, lithium silicon, lithium aluminum, lithiated carbons such as those based on coke, hard carbon, graphite, nanotubes or $C_{60}$, and lithiated metal nitrides. The negative electrode members of electrochemical cells also may further include either a magnesium-, calcium-, zinc-, manganese-, or yttrium-based negative electrode.

In another aspect of the present invention, an electrochemical cell, preferably a primary or rechargeable battery cell, is provided which employs the nanocomposite of the present invention as the cathode material. The cell may be prepared by any known method. The nanocomposite electrode (cathode) materials function well with most other known primary or secondary cell composition components, including polymeric matrices and adjunct compounds, as well as with commonly used separator and electrolyte solvents and solutes.

In another aspect of the present invention, a nanocomposite having capacity retention upon storage is prepared by a method including the steps of (a) combining metal fluoride and a conductive matrix to form a first product; (b) combining the first prodUct with a phosphate adding compound forming a second product and (c) fabricating the second product a into a nanocomposite by any suitable known method for forming nanocomposites. Preferably, the method is the high-energy impact milling method described above. Suitable phosphate adding compounds include lithium metaphosphate, lithium hydrogen phosphate, hydrogen phosphate, methyl phosphate, ammonium phosphate, or ammonium hydrogen phosphate. A suitable conductive matrix may be one selected from metal oxides, sulfides, selenides, tellurides, nitrides, or more specifically, $VO_2$, $MoO_2$, $MoS_2$, $MoO_3$, $V_{2O2}$, CuO, $Cf_{0.8 \cdot x}$ and $MoO_x,F_z$. Preferably, the conductive matrix is $MoO_x,F_z$, wherein x is $0 \leq x \leq 3$ and z is $0 \leq z \leq 5$ combined in such a way that the effective charge on the Mo cation is not more than 6+ or $MoO_3$.

The present invention is illustrated more fully by means of the following non-limiting Examples which set forth the application of phosphates to three types of metal fluoride nanocomposites. The first nanocomposite consists of CuF2: $MoO_3$ (a transition metal fluoride and a metal oxide matrix), while the second nanocomposite BiF3:$MoS^2$ (a non transition metal fluoride and a metal sulfide matrix). A third nanocomposite consists of CuF:$Bi^2Te_3$.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments that were performed. Efforts have been made to ensure accuracy with respect to numbers used (e.g. amounts, temperature, etc.) but some experimental errors and deviations should be accounted for. Unless indicated otherwise, parts are parts by weight, molecular weight is weight by average molecular weight, temperature is in degrees Centigrade, and pressure is at or near atmospheric.

Example 1

Preparation of Copper Fluoride and Phosphate Nanocomposite with $MoO_3$ Conductive Matrix with Lithium Metaphosphate Approximately 1 g of $CuF_2$, and 15% $MoO_3$ were milled in a high-energy impact mill under a helium atmosphere for 20 min. and subsequently annealed at 200° C. before the sample was extracted. The resulting mixture is designated "CM" herein. CM was composed of crystallites of approximately 30 nm. After fabrication of CM, various weight percentages of lithium metaphosphate ($Li_3PO_3$—$LiH_2PO_4$) were mixed with the CM composition. Specifically, 2 weight % lithium metaphosphate; 5 weight % lithium metaphosphate, 10 weight % lithium metaphosphate; 15 weight % metaphosphate %; and 20 weight % lithium metaphosphate were mixed with the CM in different samples. A nanocomposite was formed by high energy milling of the composition for a period of 1 h, after which the composition was annealed at 250° C. for a period of 30 minutes in Argon. The compositions were fabricated into electrodes and assembled into duplicate (a,b) electrochemical cells for evaluation. The cells were discharged at 7.58 mA/g at 24° C., the resultant voltage profiles and capacity is shown in FIG. 2.

Electrodes were prepared by adding poly(vinylidene fluoride-co-hexafluoropropylene) (Kynar 2801, Elf Atochem), carbon black (Super P, MMM) and propylene carbonate (Aldrich) to the active materials in acetone. The slurry was tape cast, dried for 1 hour at 22° C., and rinsed in 99.8% anhydrous ether (Aldrich) to extract the propylene carbonate plasticizer. The electrodes, 1 $cm^2$ disks typically containing 63±1% active material and 13±1% carbon and 23% Kynar 2801, were tested electrochemically versus Li metal (Johnson Matthey). The Swagelok (in-house) or coin (NRC or Hohsen) cells were assembled in a Helium-filled dry box using Whatman GF/D glass fiber separators saturated with electrolytes. Electrolyte "a" was 1M $LiPF_6$ in ethylene carbonate: dimethyl carbonate (EC:DMC 1:1 in vol.) electrolyte (Merck), electrolyte "b" was another industry utilized electrolyte, electrolyte "c" was yet another electrolyte utilized in industry consisting of lithium bis(trifluoromethane sulfone) imide ($LiN(SO_2CF_3)_2$, LiTFSI) salt dissolved in a blend of carbonate solvents. All electrolytes had water contents less than 25 ppm. The cells were controlled by Mac-Pile (Biologic) or Maccor battery cycling systems. Cells were cycled under a constant current of 7.58 mA/g of composite at 24° C., unless noted otherwise. All specific capacities are calculated utilizing the weight of all the composite components.

The materials were evaluated for their electrochemical properties in lithium metal "half" cells which are utilized in the art for characterization of electrode materials intended for use in lithium or lithium ion batteries.

Figure 2:
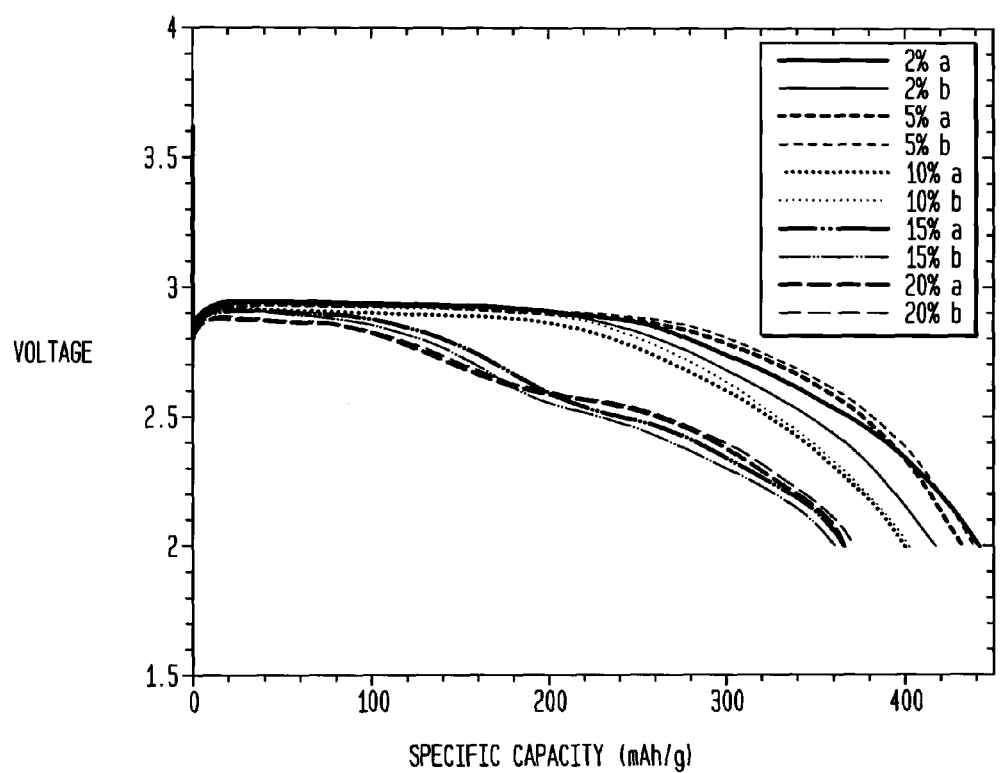
FIG. 2 is a graph depicting voltage as a function of specific capacity of a copper fluoride compound and phosphate nanocomposite where varying weight percentages of lithium metaphosphate were mixed with the composition.

As can be seen in FIG. 2, the nanocomposites routinely have specific capacities in excess 400 mAh/g based on the weight of the entire composite. Accounting for the weight of the matrix in the $CuF_2$ nanocomposite, it is clear that exceptional specific energy densities at greater than 90% of the theoretical composite capacity are achieved.

The above fabricated and annealed materials structures were identified by ex situ x-ray diffraction (XRD) using in some cases silicon (−325 mesh powder, Johnson Matthey) as internal standard in a X2 Scintag diffractometer with CuKα as radiation source. A least square fit determined a coefficient for a second order polynomial used to correct all the observed peaks of the spectrum before lattice parameters calculation. The material microstructure was analyzed by combined transmission electron microscopy (TEM) and selected area electron diffraction (SAED). TEM images were obtained using a Topcon 002B microscope operating at 200 kV. In addition to imaging, selected area electron diffraction patterns (SAED) from various areas were obtained to determine the structure of the phases present.

Figure 3:
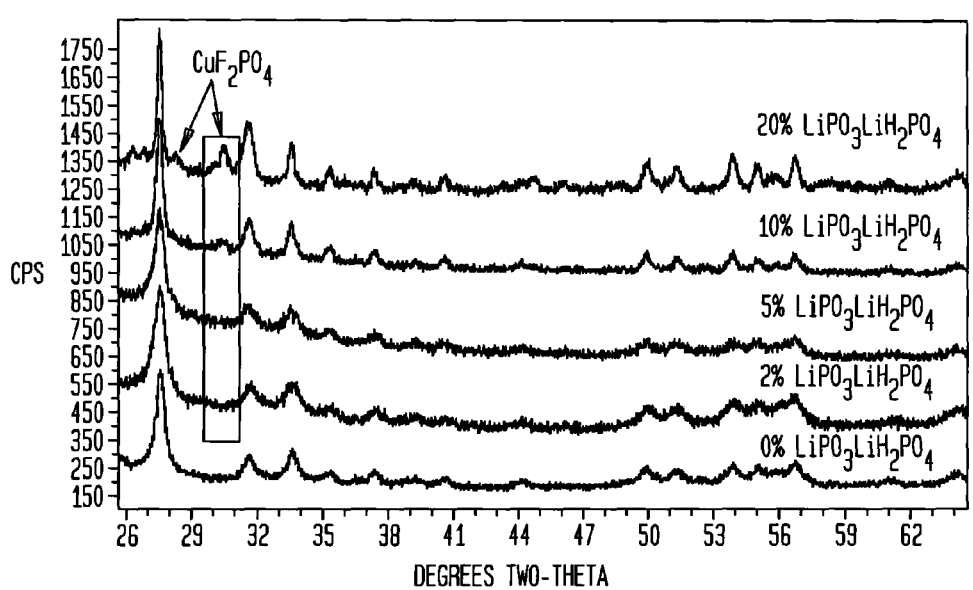
FIG. 3 shows X-ray diffraction data of copper fluoride compound and phosphate nanocomposite compounds fabricated with varying weight percentages of lithium metaphosphate.

All the XRD patterns, as shown in FIG. 3, reveal the presence of broad diffraction peaks characteristic of primary $CuF_2$ crystallite sizes on the order of 10-30 nm. The samples containing the higher percentages of metaphosphate reveal the presence of new peaks associated with the formation of $Cu_2FPO_4$ second phase. This phase has broad peaks associated with nano-sized crystallites

Example 2

Figure 4:
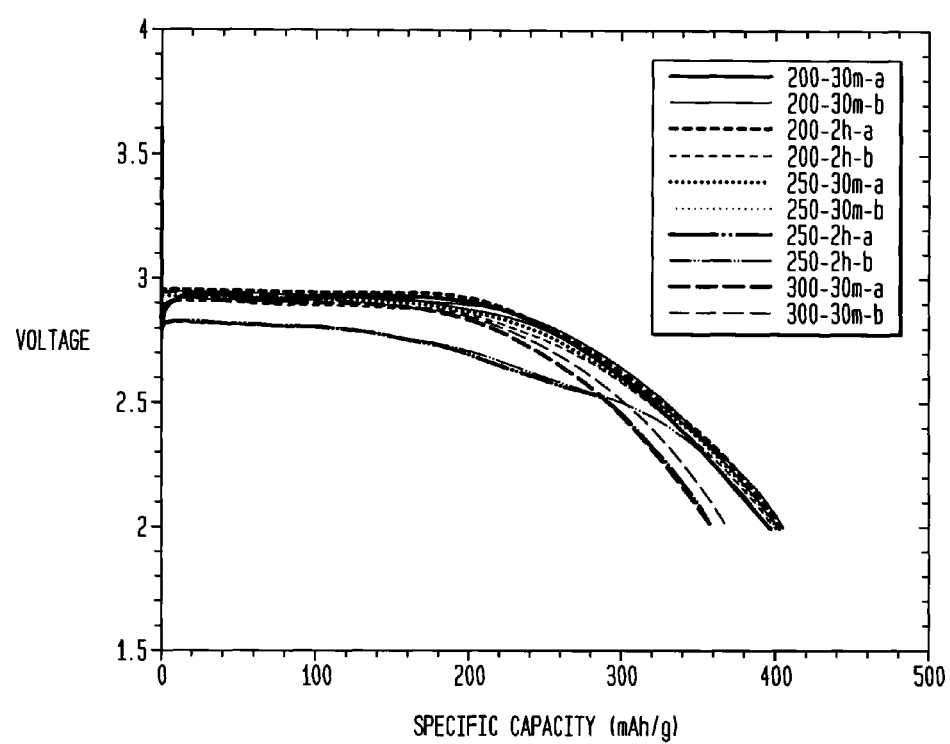
FIG. 4 is a graph depicting voltage as a function of specific capacity for a copper fluoride compound and phosphate nanocomposite where varying weight percentages of lithium metaphosphate were added and subsequently annealed at varying temperatures and times.

Preparation of Copper Fluoride and Phosphate Nanocomposites with $MoO_3$ Conductive Matrix with Lithium Metaphosphate Annealed at High Temperatures CM compositions were fabricated as noted in Example 1. After fabrication, 10 weight % of lithium metaphosphate ($Li_3PO_3$—$LiH_2PO_4$) was mixed with the CM composition. A nanocomposite was formed by high energy milling the composition for a period of 1 h, after which the composition was annealed at various times and temperatures under a flowing Argon atmosphere. Specifically, the nanocomposite was annealed at 200° C., 250° C., and 300° C. The nanocomposites were annealed for 30 minutes and 2 hours at each temperature. The compositions were fabricated into electrodes and assembled into duplicate (a,b) electrochemical cells for evaluation in a manner which has been described previously. The cells were discharged at 7.58 mA/g at 24° C. and the resultant voltage profiles and capacity is shown in FIG. 4. As can be seen in FIG. 4, the specific capacity is exemplary for all the temperatures study with anneal temperatures at or greater than 200° C., specifically 200° C., 250° C., and 300° C. These samples revealed high specific capacities of approximately 400 mAh/g based on the weight of the entire composite.

Figure 5:
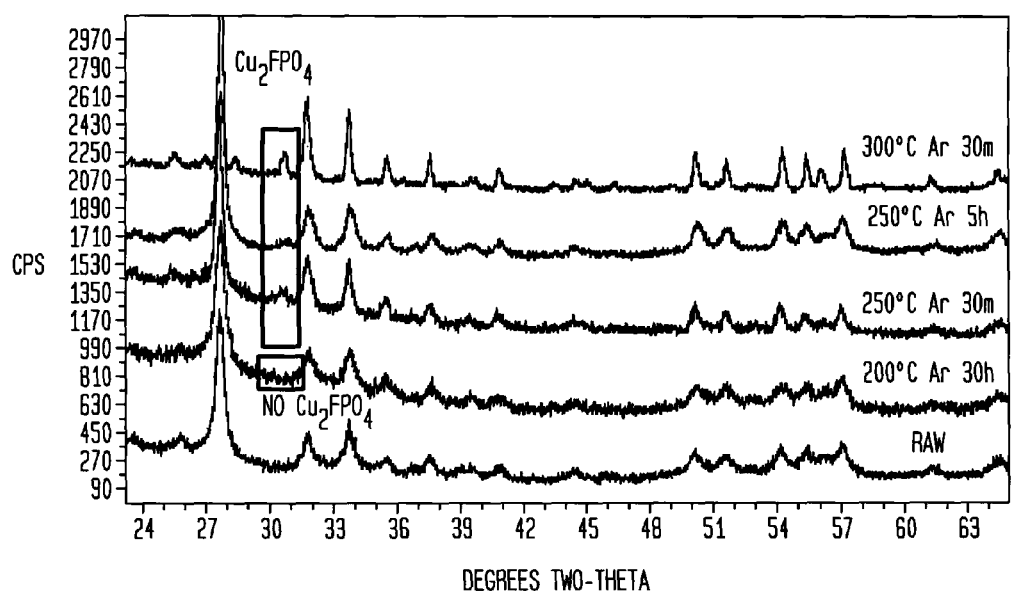
FIG. 5 depicts X-ray diffraction data of copper fluoride compound and phosphate nanocomposites where lithium metaphosphate was added and subsequently annealed at varying temperatures and times.

FIG. 5 shows the XRD patterns of the fabricated samples including a CM composition with no phosphate additions. All the XRD patterns reveal the presence of broad diffraction peaks characteristic of primary $CuF_2$ crystallite sizes on the order of 10-30 nm. The samples which were annealed at temperatures greater than 200° C. reveal the presence of new peaks associated with the formation of $Cu_2FPO_4$ second phase of nanosized domains.

Example 3

Figure 6:
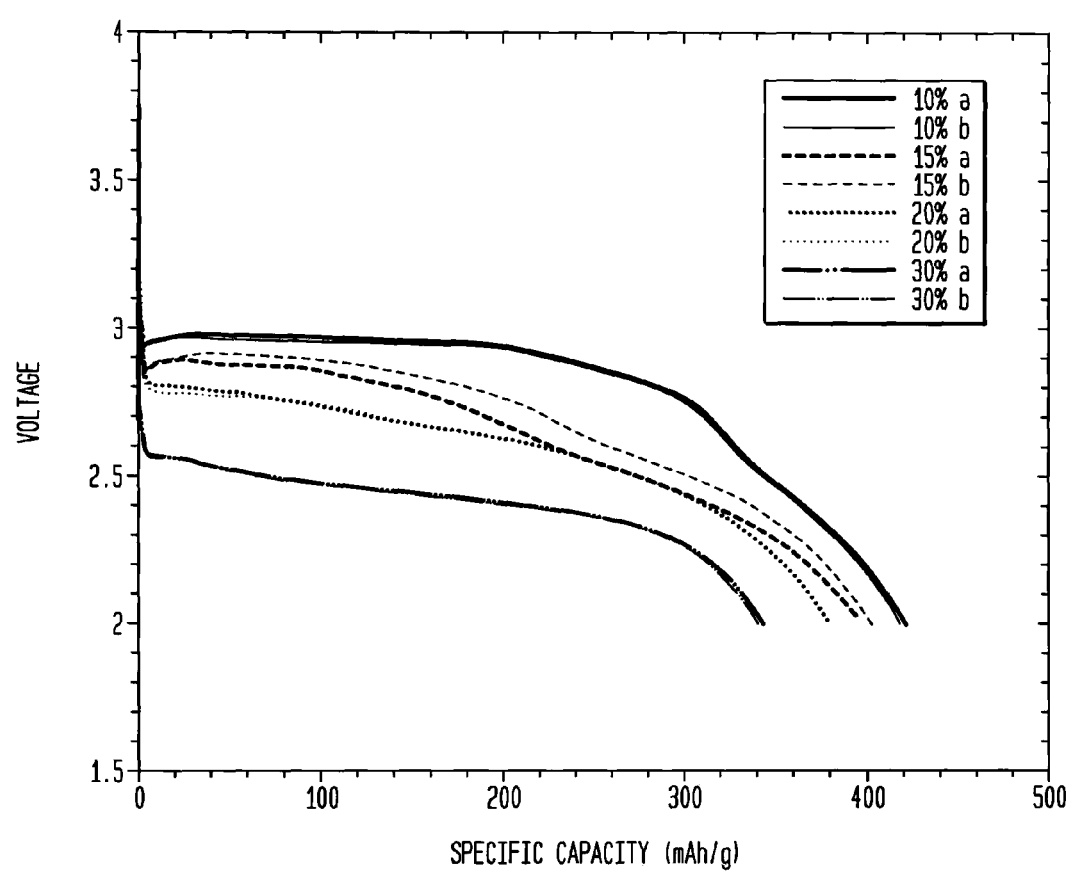
FIG. 6 is a graph depicting voltage as a function of specific capacity for a copper fluoride compound and phosphate nanocomposite where varying weight percentages of lithium dihydrogen phosphate were added.

Preparation of Copper Fluoride and Phosphate Nanocomposites with $MoO_3$ Conductive Matrix with Lithium Dihydrogen Phosphate CM compositions were fabricated as described in Example 1. After fabrication, various weight percentages of lithium dihydrogen phosphate ($LiH_2PO_4$) were mixed with the CM composition. Specifically, 10% lithium dihydrogen phosphate, 15% lithium dihydrogen phosphate, 20% lithium dihydrogen phosphate and 30% lithium dihydrogen phosphate were mixed with the CM. A nanocomposite was formed by high energy milling the composition for a period of 1 h after which, the composition was annealed at 250° C. for a period of 30 minutes in Argon. The compositions were fabricated into electrodes and assembled in duplicate (a, b) into electrochemical cells for evaluation as described above. The cells were discharged at 7.58 mA/g at 24° C. and the resultant voltage profiles and capacity is shown in FIG. 6. The specific capacity is exemplary for all the compositions with many compositions achieving greater than 400 mAh/g based on the weight of the entire composite.

Figure 7:
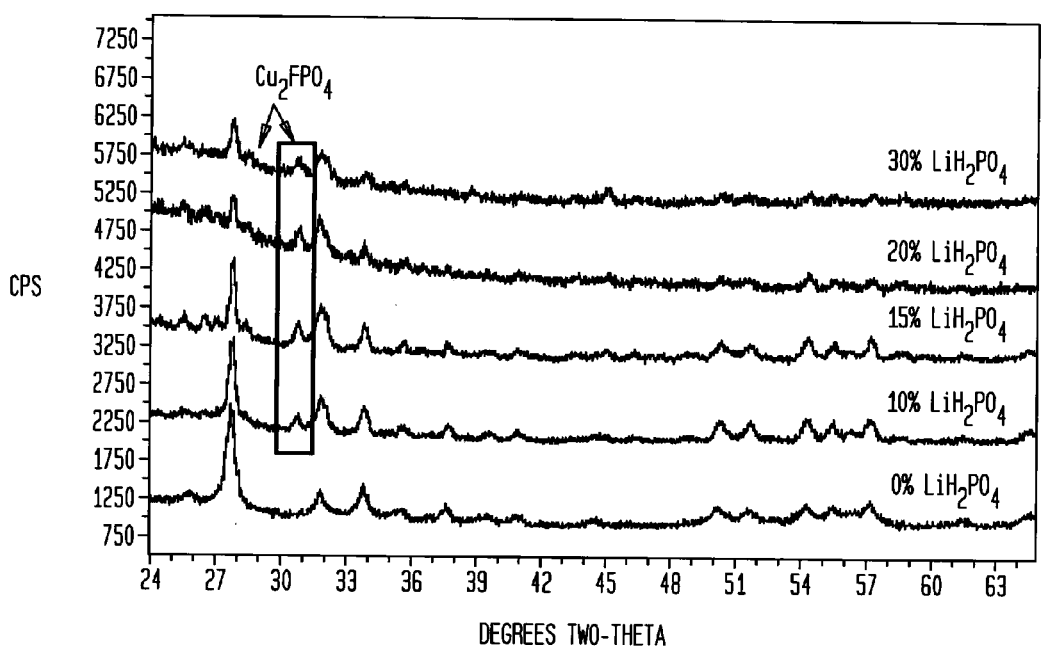
FIG. 7 depicts X-ray diffraction data of copper fluoride compound and phosphate nanocomposites fabricated with varying weight percentages of lithium dihydrogen phosphate.

FIG. 7 shows XRD patterns of the samples. All the XRD patterns reveal the presence of broad diffraction peaks characteristic of primary $CuF_2$ crystallite sizes on the order of 10-30 nm. The samples containing the higher percentages of $LiH_2PO_4$ reveal the presence of new peaks associated with the formation of greater quantities of a nanocrystalline $Cu_2FPO_4$ second phase.

Example 4

Figure 8:
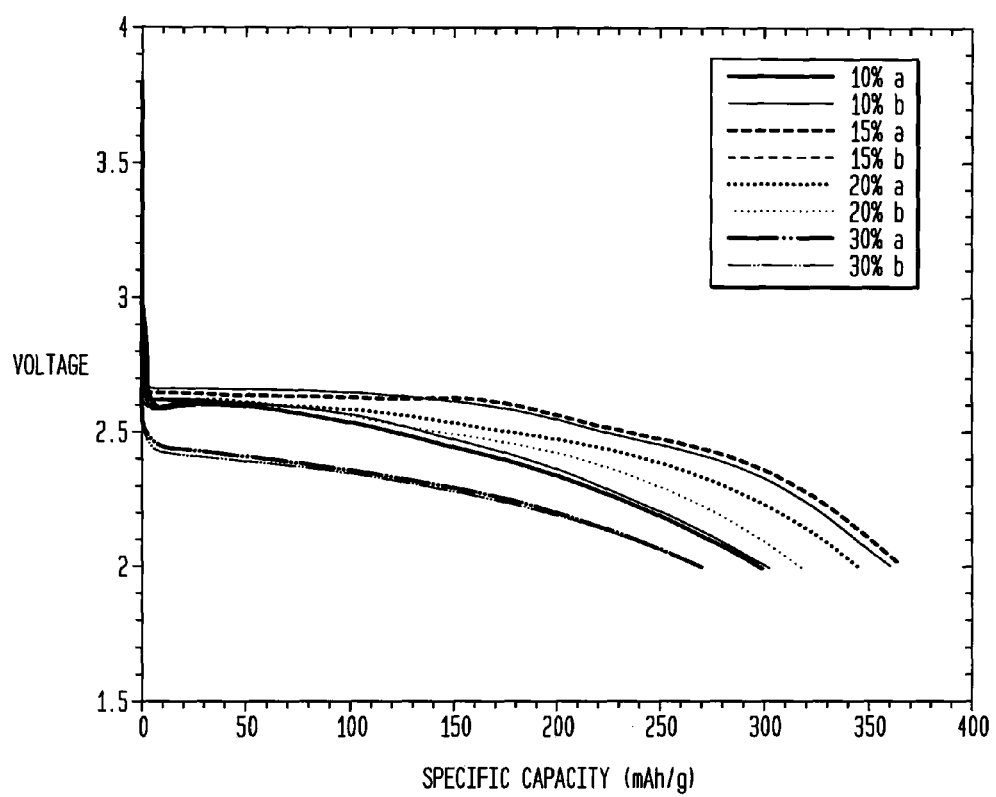
FIG. 8 is a graph depicting voltage as a function of specific capacity for copper fluoride compound and phosphate nanocomposites where varying weight percentages of hydrogen phosphate were added.

Copper Fluoride and Phosphate Nanocompositions with $MoO_3$ Conductive Matrix with Hydrogen Phosphate CM compositions were fabricated as described above in Example 1. After fabrication, various weight percentages of hydrogen phosphate $H_3PO_4$ were mixed with the CM composition. Specifically, 10 weight % of hydrogen phosphate, 15 weight % of hydrogen phosphate, 20 weight % of hydrogen phosphate, and 30 weight percent % of hydrogen phosphate were mixed with CM. A nanocomposite was formed by high energy milling the composition for a period of 1 h after which the composition was annealed at 250° C. for a period of 30 minutes in Argon. The compositions were fabricated into electrodes and assembled in duplicate (a, b) into electrochemical cells for evaluation in a manner described above. The cells were discharged at 7.58 mA/g at 24° C. and the resultant voltage profiles and capacity is shown in FIG. 8. As can be seen in FIG. 8, the specific capacity is high for all the compositions with many compositions achieving greater than 325 mAh/g based on the weight of the entire composite.

Figure 9:
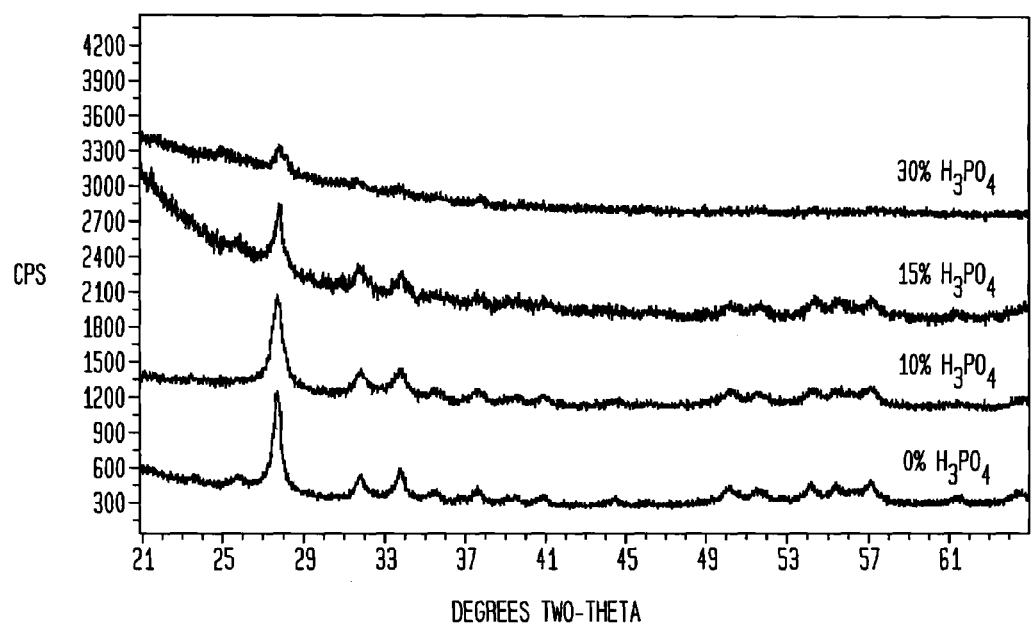
FIG. 9 depicts X-ray diffraction data of copper fluoride compound and phosphate nanocomposites fabricated with varying weight percentages of hydrogen phosphate.

FIG. 9 shows the x-ray diffraction patterns of the samples. All the XRD patterns reveal the presence of broad diffraction peaks characteristic of primary $CuF_2$ crystallite sizes on the order of 10-30 nm. The samples containing the higher percentages of $H_3PO_4$ do not reveal the presence of new peaks associated with the formation of $Cu_2FPO_4$ second phase. Therefore the phosphate phase is x-ray amorphous.

Example 5

Evaluation of Performance of Copper Fluoride and Phosphate Nanocomposites

The copper fluoride compositions described in Examples 1-4 were fabricated into electrodes and placed into electrochemical cells to evaluate their performance as positive electrode materials in lithium batteries. To evaluate charge retention under the most severe conditions, the cells were discharged to a capacity of 100 mAh/g at 24° C. (partial discharge). After this period the cells were placed into storage at 60° C. for a period of one week. After the storage period the cells were placed back at 24° C. and the discharge was continued. The total specific capacity was calculated and tabulated in TABLE 1 below. It is readily apparent that the use of phosphate as described in the various examples resulted in exceptional improvement of the elevated temperature storage capability. As can be seen the $CuF_2$:$MoO_3$ nanocomposite without any phosphate had an accumulated capacity of 100 mAh/g, of which 100 mAh/g was the capacity recorded at room temperature before 60° C. storage. Therefore, no capacity was left in the cell after storage at elevated temperature. In sharp contrast, the samples which contained phosphate exhibit an extraordinary capability to retain specific capacity at elevated temperatures. Indeed, the specific capacity was found to be on the order of the discharge specific capacity obtained at room temperature as defined by the above examples. Of the various phosphates shown here, $LiH_2PO_4$ exhibited the best capacity retention. It should also be noted that although a variety of electrolytes were utilized in the evaluation, only small differences were seen to exist in their effect on the storage characteristics of the nanocomposite.

TABLE 1

| Phosphate Composition | wt % | Anneal T (° C.) | t(h) | Electrolyte | Sample | PDD 60° C. |
|---|---|---|---|---|---|---|
| No phosphate | 0% | | | A | a | 100 mAh/g |
| No phosphate | 0% | | | A | b | 100 mAh/g |
| No phosphate | 0% | | | B | a | 100 mAh/g |
| No phosphate | 0% | | | B | b | 100 mAh/g |
| $LiPO_3LiH_2PO_4$ | 10% | 250° C. | 2 h | A | a | 276 mAh/g |
| $LiPO_3LiH_2PO_4$ | 10% | 250° C. | 2 h | A | b | 289 mAh/g |
| $LiPO_3LiH_2PO_4$ | 10% | 250° C. | 2 h | B | a | 311 mAh/g |
| $LiPO_3LiH_2PO_4$ | 10% | 250° C. | 2 h | B | b | 337 mAh/g |
| $LiPO_3LiH_2PO_4$ | 10% | 250° C. | 2 h | C | a | 308 mAh/g |
| $LiPO_3LiH_2PO_4$ | 10% | 250° C. | 5 h | A | a | 269 mAh/g |
| $LiPO_3LiH_2PO_4$ | 10% | 250° C. | 5 h | A | b | 274 mAh/g |
| $LiPO_3LiH_2PO_4$ | 10% | 250° C. | 2 h | B | a | 235 mAh/g |
| $LiPO_3LiH_2PO_4$ | 10% | 250° C. | 2 h | B | b | 278 mAh/g |
| $LiPO_3LiH_2PO_4$ | 15% | 250° C. | 0.5 h | A | a | 243 mAh/g |
| $LiPO_3LiH_2PO_4$ | 15% | 250° C. | 0.5 h | A | b | 248 mAh/g |
| $LiPO_3LiH_2PO_4$ | 15% | 250° C. | 0.5 h | B | a | 311 mAh/g |
| $LiPO_3LiH_2PO_4$ | 15% | 250° C. | 0.5 h | B | b | 98 mAh/g |
| $H_3PO_4$ | 15% | 250° C. | 0.5 h | B | a | 301 mAh/g |
| $H_3PO_4$ | 15% | 250° C. | 0.5 h | B | b | 304 mAh/g |
| $H_3PO_4$ | 20% | 250° C. | 0.5 h | B | a | 303 mAh/g |
| $LiH_2PO_4$ | 10% | 250° C. | 0.5 h | A | a | 362 mAh/g |
| $LiH_2PO_4$ | 10% | 250° C. | 0.5 h | A | b | 350 mAh/g |
| $LiH_2PO_4$ | 15% | 250° C. | 0.5 h | B | a | 365 mAh/g |
| $LiH_2PO_4$ | 15% | 250° C. | 0.5 h | B | b | 359 mAh/g |
| $LiH_2PO_4$ | 20% | 250° C. | 0.5 h | B | a | 356 mAh/g |
| $LiH_2PO_4$ | 20% | 250° C. | 0.5 h | B | b | 359 mAh/g |

Example 6

Figure 10:
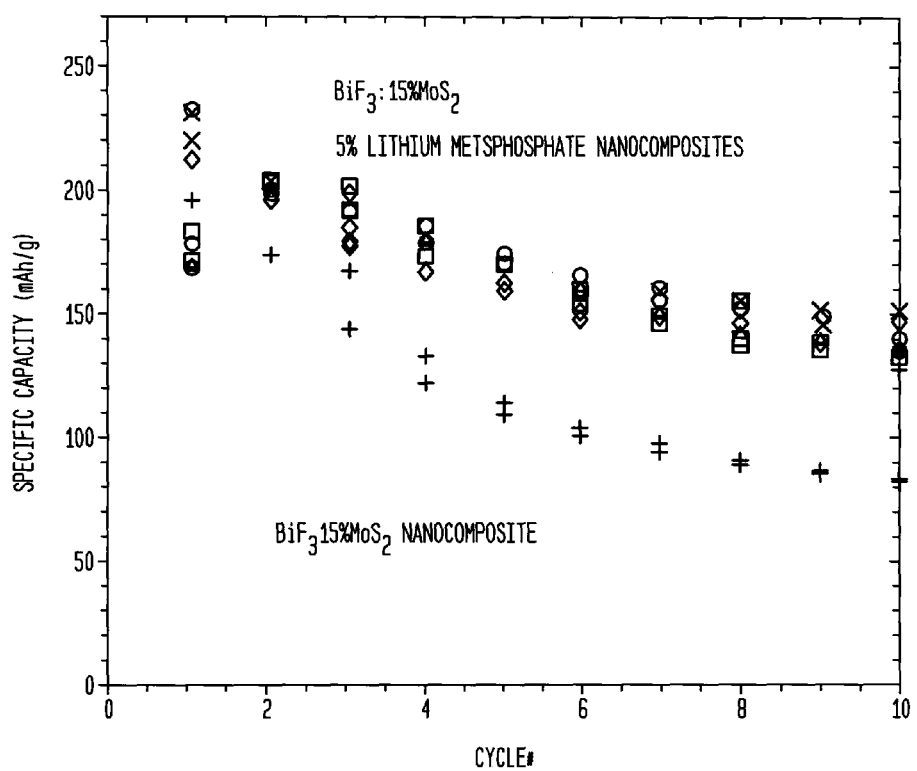
FIG. 10 is a graph depicting specific capacity as a function of cycle number of a bismuth fluoride compound and phosphate nanocomposite where varying amounts of lithium metaphosphate were added.

Bismuth Fluoride and Phosphate Nanocomposite with $MoS_2$ Conductive Matrix with Lithium Metaphosphate $BiF_3$ and a conductive matrix of 20% $MoS_2$ were sealed under Helium and a nanocomposite was fabricated through the high energy milling of the respective components for various times in a Spex 8000 milling apparatus. The nanocomposite was annealed under Argon. To this composition 5 weight % of lithium metaphosphate was high energy milled and the composite was heat treated at 200° C. under argon atmosphere. The resulting plot of capacity vs. cycle life is shown in FIG. 10 and shows a marked improvement in the capacity retention as a function of cycle life for a variety of compositions containing phosphate vs. the non-phosphate containing compositions.

Example 7

In order to show good electrochemical performance in a nanocomposite using a drastically different electronically conductive matrix besides molybdenum and oxygen, a nanocomposite was fabricated utilizing an alloy composition consisting of bismuth and telluride. A nanocomposite was formed by high energy milling $CuF_2$ with a 10 weight % $LiH_2PO_4$ composition for a period of 1 h, after which the composition was annealed at 250° C. for a period of 30 minutes in Argon. A 10 weight % conductive matrix of bismuth telluride ($Bi_2Te_3$) was milled within the nanocomposite for 45 minutes. The compositions were fabricated into electrodes and assembled into electrochemical cells for evaluation in a manner which has been described previously. The cells were discharged at 7.58 mA/g at 24° C. and the resultant voltage profiles and capacity is shown in the figure below.

Figure 11:
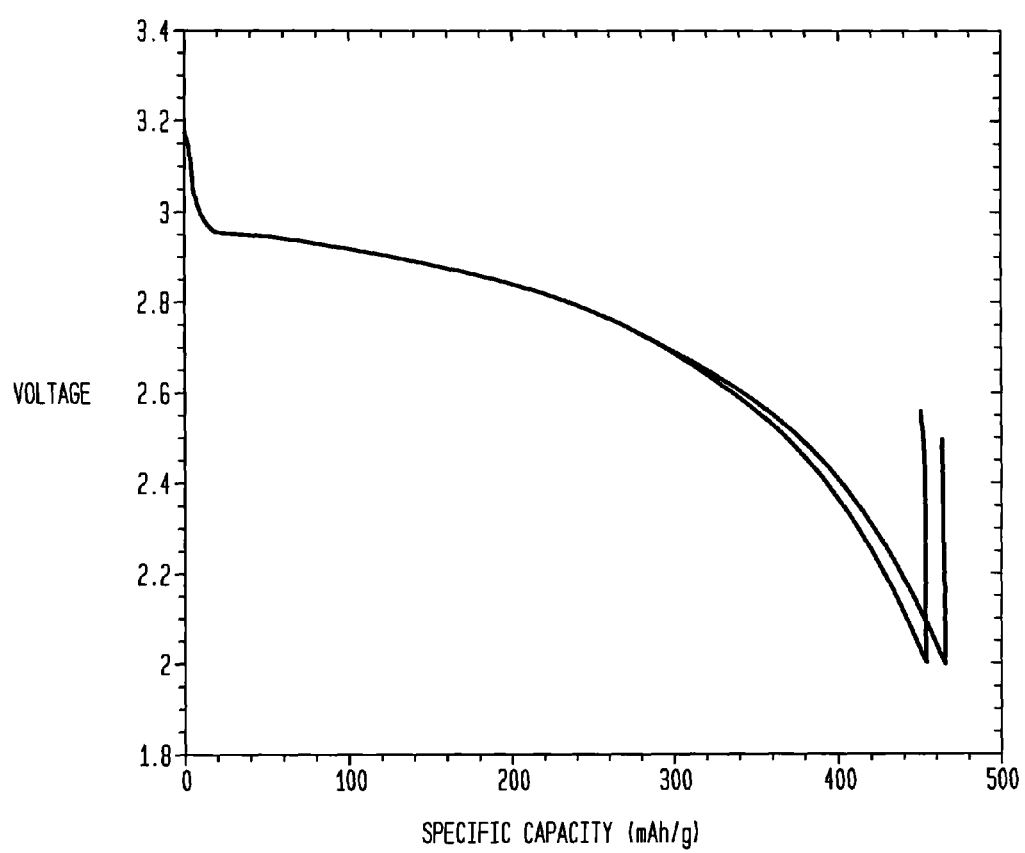
FIG. 11 is a graph depicting voltage as a function of specific capacity for a copper fluoride compound incorporating bismuth telluride as a conductive matrix where lithium hydrogen phosphate has been added.

As can be seen in FIG. 11, even utilizing the alternative electronically conducting matrices besides the molybdates described above, that improved performance can be obtained with copper fluoride nanocomposites containing phosphate.

While the present invention has been described with respect to what is presently considered to be the preferred embodiment(s), it is to be understood that the invention is not limited to the disclosed embodiment(s). To the contrary, the invention is intended to cover various modifications and equivalent compositions and/or arrangements included within the spirit and scope of the appended claims. The scope of the following claims is to be accorded the broadest interpretation so as to encompass all such modifications and equivalent structures and functions.

References
1. P. Poizot, S. Laruelle, S. Grugeon, L. Dupont and J.-M. Tarascon, *Nature (London)*, 407 496 (2000)
2. N. Pereira, M. Balasubramanian, L. Dupont, J. McBreen, L. C. Klein and G. G. Amatucci, *J. Electrochem. Soc.,* 150(8) A1118 (2003)
3. H. Li, G. Richter, J. Maier, Advanced Materials 15, 736 (2003).
4. F. Badway, N. Pereira, F. Cosandey, and G. G. Amatucci, J. Electrochem. Soc., 150, A1209, (2003).
5. I. Plitz, F. Badway, J. Al-Sharab, A. DuPasquier, F. Cosandey, and G. G. Amatucci, J. Electrochem. Soc. 152, A307 (2005).
6. M. Bervas, F. Badway, L. C. Klein, and G. G. Amatucci, Electrochem. And Solid State Letters, 8, A179 (2005).
7. M. Bervas, L. C. Klein, and G. G. Amatucci, J. Electrochem. Soc., 153, A159 (2006).
8. M. Bervas, A. N. Mansour, W. S. Yoon, J. Al-Sharab, F. Badway, F. Cosandey, L. C. Klein, and G. G. Amatucci, J. Electrochem. Soc., 153, A799 (2006).
9. H. F. Bauman, Proceedings of the 20$^{th}$ Annual Power Sources Conference, PSC Publications, May 1966, p 73.
10. H. F. Bauman, 18$^{th}$ Annual Power Sources Conference, PSC Publications, May 1964, p 89.
11. H. F. Bauman, Proceedings of the 20th Annual Power Sources Conference, May 1966, PSC Publications, 73-76.
12. W. E. Elliott, J. R. Huff, G. L. Simmons, G. D. McDonald, J. L. Jamrozy, W. L. Towle, Contract report NASA CR-54873 Dec. 31, 1965.

We claim:

1. A nanocomposite for an energy storage electrochemical cell comprising a metal fluoride component and a phosphate component,
    wherein the nanocomposite is further characterized as having the following properties:
    (a) the metal fluoride component comprises a pure metal fluoride phase;
    (b) the phosphate component comprises from about 2 weight percent to less than about 50 weight percent of phosphate and comprises a phosphate matrix;.
    (c) the metal fluoride component is disposed in the phosphate matrix;
    (d) at least one dimension of each of the metal fluoride component and the phosphate component is less than 100 nm; and the nanocomposite is a component of an electrode.

2. The nanocomposite according to claim 1, wherein the metal of the metal fluoride is selected from the group consisting of Fe, Se, Te, Cr, Nb, Rh, Ag, Au, Co, Ni, Mn, Cu, V, Mo, Pb, Sb, Bi, and Si.

3. The nanocomposite according to claim 2, wherein the metal of the metal fluoride is selected from the group consisting Cu, Bi, and Fe.

4. The nanocomposite according to claim 1, wherein the metal fluoride is doped with up to approximately 10% oxygen.

5. The nanocomposite according to claim 1, wherein the phosphate component is a distinct subdomain distributed within the phosphate matrix.

6. The nanocomposite according to claim 1, wherein the phosphate of the phosphate component is a metal phosphate, a fluorophosphates, or a metal fluorophosphates.

7. The nanocomposite according to claim 6, wherein the phosphate of the phosphate component is copper fluorophosphate.

8. The nanocomposite according to claim 1, wherein the phosphate matrix further comprises a conductive matrix.

9. The nanocomposite according to claim 8, wherein the conductive matrix is selected from the group consisting of $VO_2$, $MoO_2$, $MoO_3$, $MoS_2$, $V_2O_5$, $V_6O_{13}$, NiO, CuO, carbon fluorides, nitrides, selenides, tellurides, silicates, molybdenum sulfides, molybdenum oxysulfides, titanium sulfide, chromium oxide, manganese oxide ($MnO_2$), and $MoO_xF_z$, wherein x is $0 \leq x \leq 3$ and z is $0 \leq z \leq 5$ combined in such a way that an effective charge on the Mo cation is not more than $6^+$.

10. The nanocomposite according to claim 1 which further comprises a second electronically conductive constituent.

11. The nanocomposite according to claim 10, wherein the second electronically conductive constituent comprises a metal sulfide, fluoride, silicate, bromide, borate, telluride, nitride, oxide, iodide, or selenide.

12. The nanocomposite according to claim 1 which further comprises carbon or oxygen.

13. A positive electrode composition comprising the nanocomposite of claim 1, wherein
    the electrode demonstrates a specific capacity of about 100 mAh/g to about 600 mAh/g at a voltage of about 2 volts to about 4 volts when compared to a Li/Li+reference potential.

14. The positive electrode composition according to claim 13, wherein the specific capacity is rechargeable by passing a current through the nanocomposite in a direction opposite a discharge direction.

15. An electrochemical cell comprising:
    a negative electrode;
    a positive electrode comprising the positive electrode composition according to claim 13; and
    a separator disposed between the negative and positive electrodes.

16. The electrochemical cell according to claim 15, wherein the electrochemical cell further comprises an electrolyte composition.

17. The electrochemical cell according to claim 16, wherein the electrolyte composition includes at least one metallic salt.

18. The electrochemical cell according to claim 17, wherein the at least one metallic salt is selected from the group consisting of a lithium salt, a magnesium salt, a calcium salt, a zinc salt, a manganese salt and a yttrium salt.

19. The electrochemical cell according to claim 18, wherein the cell has a specific capacity, the specific capacity rechargeable by passing a current through the nanocomposite in a direction opposite a discharge direction.

20. The electrochemical cell according to claim 15, further comprising a lithium-based negative electrode.

21. The electrochemical cell according to claim 15, further comprising a negative electrode selected from the group consisting of a magnesium-based negative electrode, a calcium-based negative electrode, a zinc-based negative electrode, a manganese-based negative electrode, and a yttrium-based negative electrode.

22. The nanocomposite according to claim 1, wherein the metal fluoride component disposed in the phosphate matrix comprises particles, wherein:
   i) the particles comprise nanocrystallites, X-ray amorphous nanodomains, or a combination thereof;
   (ii) the particles range in size from about 1 nm to about 100 nm in diameter; and
   (iii) the particles exhibit an X-ray diffraction (XRD) distribution into a first phase and at least one second phase, wherein the first phase contains the metal fluoride component comprising the pure metal fluoride phase in the form of metal fluoride nanocrystallites, and the second phase comprises a metal fluorophosphate.

23. The nanocomposite according to claim 5, wherein the subdomain is in the form of nanocrystallites, X-ray amorphous nanodomains, or a combination thereof, wherein the phosphate of the phosphate component is a metal phosphate, a fluorophosphate, or a metal fluorophosphate.

24. The nanocomposite according to claim 23, wherein the subdomain contains the metal fluorophosphate of the phosphate component in the form of X ray amorphous nanodomains, wherein the metal fluorophosphate of the phosphate component comprises more than 70% molar content of the metal fluoride component.

25. The nanocomposite according to claim 23, wherein the subdomain contains the metal fluorophosphates of the phosphate component in the form of nanocrystallites, wherein the metal fluorophosphate of the phosphate component comprises more than 70% molar content of the metal fluoride component.

* * * * *

UNITED STATES PATENT AND TRADEMARK OFFICE
CERTIFICATE OF CORRECTION

| | | |
|---|---|---|
| PATENT NO. | : 8,518,604 B2 | Page 1 of 1 |
| APPLICATION NO. | : 12/025662 | |
| DATED | : August 27, 2013 | |
| INVENTOR(S) | : Glenn G. Amatucci et al. | |

It is certified that error appears in the above-identified patent and that said Letters Patent is hereby corrected as shown below:

In the specification

Column 1, line 13, insert:

--GOVERNMENT RIGHTS
This invention was made with federal government support. Consequently, the government has certain rights in the invention.--

Signed and Sealed this
Thirty-first Day of May, 2016

Michelle K. Lee
*Director of the United States Patent and Trademark Office*